(12) United States Patent
Seo et al.

(10) Patent No.: US 11,329,533 B2
(45) Date of Patent: May 10, 2022

(54) STRUCTURE FOR ASSEMBLING TEMPERATURE SENSOR ANNULAR TERMINAL UNIT FOR DRIVE MOTOR AND METHOD OF ASSEMBLING THE TEMPERATURE SENSOR

(71) Applicant: HYUNDAI MOBIS Co., Ltd., Seoul (KR)

(72) Inventors: Yeong Woo Seo, Busan (KR); Hye Seong Yang, Gwangju (KR); Seong Jun Hwang, Yongin-si (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 0 days.

(21) Appl. No.: 16/945,897

(22) Filed: Aug. 2, 2020

(65) Prior Publication Data

US 2021/0044180 A1 Feb. 11, 2021

(30) Foreign Application Priority Data

Aug. 9, 2019 (KR) .......................... 10-2019-0097672

(51) Int. Cl.
*H02K 11/25* (2016.01)
*H02K 3/52* (2006.01)

(52) U.S. Cl.
CPC ............ *H02K 11/25* (2016.01); *H02K 3/521* (2013.01); *G01K 2205/00* (2013.01); *H02K 2203/12* (2013.01)

(58) Field of Classification Search
CPC .......... H02K 11/25; H02K 3/52; H02K 3/522; H02K 3/521; H02K 2203/12; H02K 2203/09; G01K 2205/00
See application file for complete search history.

(56) References Cited

U.S. PATENT DOCUMENTS

| 8,022,584 | B2 * | 9/2011 | Heim | H02K 11/25 310/68 C |
| 2006/0087774 | A1 * | 4/2006 | Bielesch | H02K 23/66 361/23 |
| 2012/0112580 | A1 * | 5/2012 | Sato | H02K 7/006 310/71 |
| 2012/0112581 | A1 * | 5/2012 | Maekawa | H02K 3/522 310/71 |

FOREIGN PATENT DOCUMENTS

GB 1056308 * 6/1967

* cited by examiner

*Primary Examiner* — Naishadh N Desai
(74) *Attorney, Agent, or Firm* — H.C. Park & Associates, PLC (57) ABSTRACT

A structure for assembling a temperature sensor of an annular terminal unit for a drive motor. The structure includes a terminal holder having an annular shape, a temperature sensor fixed to the terminal holder, a plurality of cores radially arranged on a lower surface of the terminal holder, a bobbin inserted into each of the plurality of cores, and a stator coil wound around each of the bobbins. The temperature sensor passes through the terminal holder in a vertical direction of the terminal holder and is inserted between the bobbins around which the stator coils are wound.

8 Claims, 6 Drawing Sheets

STRUCTURE FOR ASSEMBLING TEMPERATURE SENSOR ANNULAR TERMINAL UNIT FOR DRIVE MOTOR AND METHOD OF ASSEMBLING THE TEMPERATURE SENSOR

CROSS-REFERENCE TO RELATED APPLICATION

This application claims priority to and the benefit of Korean Patent Application No. 10-2019-0097672, filed on Aug. 9, 2019, which is hereby incorporated by reference for all purposes as if set forth herein.

BACKGROUND

Field

Exemplary embodiments of the present invention relate to a structure for assembling a temperature sensor of an annular terminal unit for a drive motor and a method of assembling the temperature sensor, and more particularly, to a structure for assembling a temperature sensor of an annular terminal unit for a drive motor, in which a temperature sensor is easily assembled into a terminal holder and an assembly process is simplified, and a method of assembling the temperature sensor.

Discussion of the Background

Generally, when drive motors used in hybrid vehicles are rapidly accelerated or decelerated, a maximum output of the motor is instantaneously generated due to driving characteristics of the vehicle, such that the temperature of a stator coil for a drive motor is rapidly increased.

As described above, since the temperature rises in the motor due to the stator coil, which is a heating element through which current flows, the temperature of the stator coil is measured and controlled to prevent overload of the motor and to protect internal parts thereof.

In the measurement of the temperature of the stator coil, it is important to have a rapid response because, although the temperature sensor itself has high performance and responsiveness, installation of the temperature sensor in the motor in a manner facilitating rapid detection of a change in the temperature of the stator coil is even more important.

Typically, such a temperature sensor is installed by a method in which the temperature sensor is placed on the stator coil and then fixed using a jig, such that the stator coil and the temperature sensor are fixed to each other using an adhesive, such as epoxy, in a designated region.

As described above, the method of installing the temperature sensor on the stator coil has a problem in that the number and time of assembly processes of the temperature sensor are increased, which is inefficient, and costs of the processes are increased.

In addition, there is a risk in that a sensor unit of the temperature sensor may be exposed to the outside of the drive motor and be damaged due to external factors. There is a problem in that the sensor unit of the temperature sensor is brought into contact with one side surface of the stator coil so that a contact surface is narrow, and the sensing performance of the temperature sensor is degraded due to contact failure occurring during the assembly process.

In addition, there is a problem in that an adhesive member such as a jig epoxy for fixing the temperature sensor to the stator coil is required, which becomes a factor of cost increasing due to material costs and assembly facilities.

The above information disclosed in this Background section is only for enhancement of understanding of the background of the invention and, therefore, it may contain information that does not constitute prior art.

SUMMARY

Exemplary embodiments of the present invention provide a structure for assembling a temperature sensor of an annular terminal unit for a drive motor, in which a temperature sensor is easily assembled into a terminal holder and an assembly process is simplified, and a method of assembling the temperature sensor.

Additional features of the invention will be set forth in the description which follows, and in part will be apparent from the description, or may be learned by practice of the invention An exemplary embodiment of the present invention provides a structure for assembling a temperature sensor of an annular terminal unit for a drive motor. The structure includes a terminal holder having an annular shape, a temperature sensor fixed to the terminal holder, a plurality of cores radially arranged on a lower surface of the terminal holder, a bobbin inserted into each of the plurality of cores, and a stator coil wound around each of the bobbins. The temperature sensor passes through the terminal holder in a vertical direction of the terminal holder and is inserted between the bobbins around which the stator coils are wound.

The terminal holder may include a body part configured to form a body of the terminal holder, an insertion hole through which an upper surface and a lower surface of the body part communicate with each other, a fixing part which extends from the lower surface of the body part in a region corresponding to the insertion hole and through which the temperature sensor passes, and a guide part which is formed along an inner upper surface of the body part having an annular shape and fixes a lead wire of the temperature sensor.

The fixing part may include a fixing protrusion extending downward from the lower surface of the body part in the region corresponding to the insertion hole, an elastic groove which is formed in the fixing protrusion in an incised shape and elastically fixes the temperature sensor, and a separation-preventing protrusion extending from a lower end part of the fixing protrusion.

The guide part may include circumferential protrusions formed to be spaced apart from each other along the inner upper surface of the body part, and a semicircular protrusion of which one surface, which is located in an inner side direction of the body part, is formed to have a curved surface.

A length of the circumferential protrusion may be greater than a length of the semicircular protrusion.

The temperature sensor may include a thermistor fixed to the fixing part, an insulator configured to surround the thermistor, and the lead wire configured to electrically connect the thermistor to a terminal of the terminal holder.

The lead wire may be brought into contact with an outer circumferential surface of the circumferential protrusion, may protrude between the circumferential protrusion and the semicircular protrusion, and may be pressed against the curved surface of the semicircular protrusion.

Another exemplary embodiment of the present invention provides a method of assembling a temperature sensor of an annular terminal unit for a drive motor. The method includes forming an insertion hole and a fixing hole and providing a terminal holder having an annular shape, in which a plurality of cores are radially arranged on a lower surface thereof, mounting a bobbin on each of the cores, winding a stator coil around each of the bobbins, providing a temperature sensor including a thermistor, an insulator, and a lead wire, inserting the temperature sensor into the insertion hole in a vertical direction of the insertion hole, fixing the lead wire to a guide part, and fixing an end part of the lead wire to the terminal holder.

The terminal holder may include a body part configured to form a body of the terminal holder, an insertion hole through which an upper surface and a lower surface of the body part communicate with each other, a fixing part which extends from the lower surface of the body part in a region corresponding to the insertion hole and through which the temperature sensor passes, and a guide part which is formed along an inner upper surface of the body part having an annular shape and fixes a lead wire of the temperature sensor. The guide part may include circumferential protrusions formed to be spaced apart from each other along the inner upper surface of the body part, and a semicircular protrusion of which one surface, which is located in an inner side direction of the body part, is formed to have a curved surface.

The guide part may include circumferential protrusions formed to be spaced apart from each other along the inner upper surface of the body part, and a semicircular protrusion of which one surface, which is located in an inner side direction of the body part, is formed to have a curved surface. The lead wire may be brought into contact with an outer circumferential surface of the circumferential protrusion, may protrude between the circumferential protrusion and the semicircular protrusion, and may be pressed against the curved surface of the semicircular protrusion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

The scope of the present invention is defined by the appended claims. The terms used herein are provided only to describe embodiments of the present invention and not for purposes of limitation. Unless the context clearly indicates otherwise, the singular forms include the plural forms. It will be understood that the terms "comprise" or "comprising" when used herein, specify some stated components, steps, operations and/or elements, but do not preclude the presence or addition of one or more other components, steps, operations and/or elements.

Hereinafter, exemplary embodiments of the present invention will be described in detail with reference to the accompanying drawings.

Figure 1:
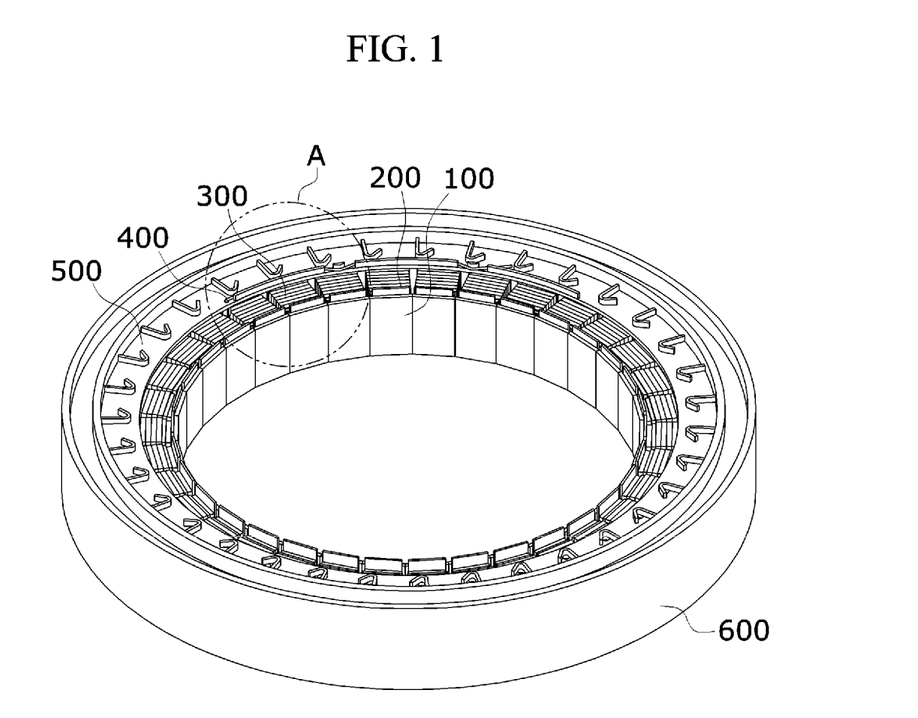
FIG. 1 is a perspective view illustrating an annular terminal unit for a drive motor according to an exemplary embodiment of the present invention.
Figure 2:
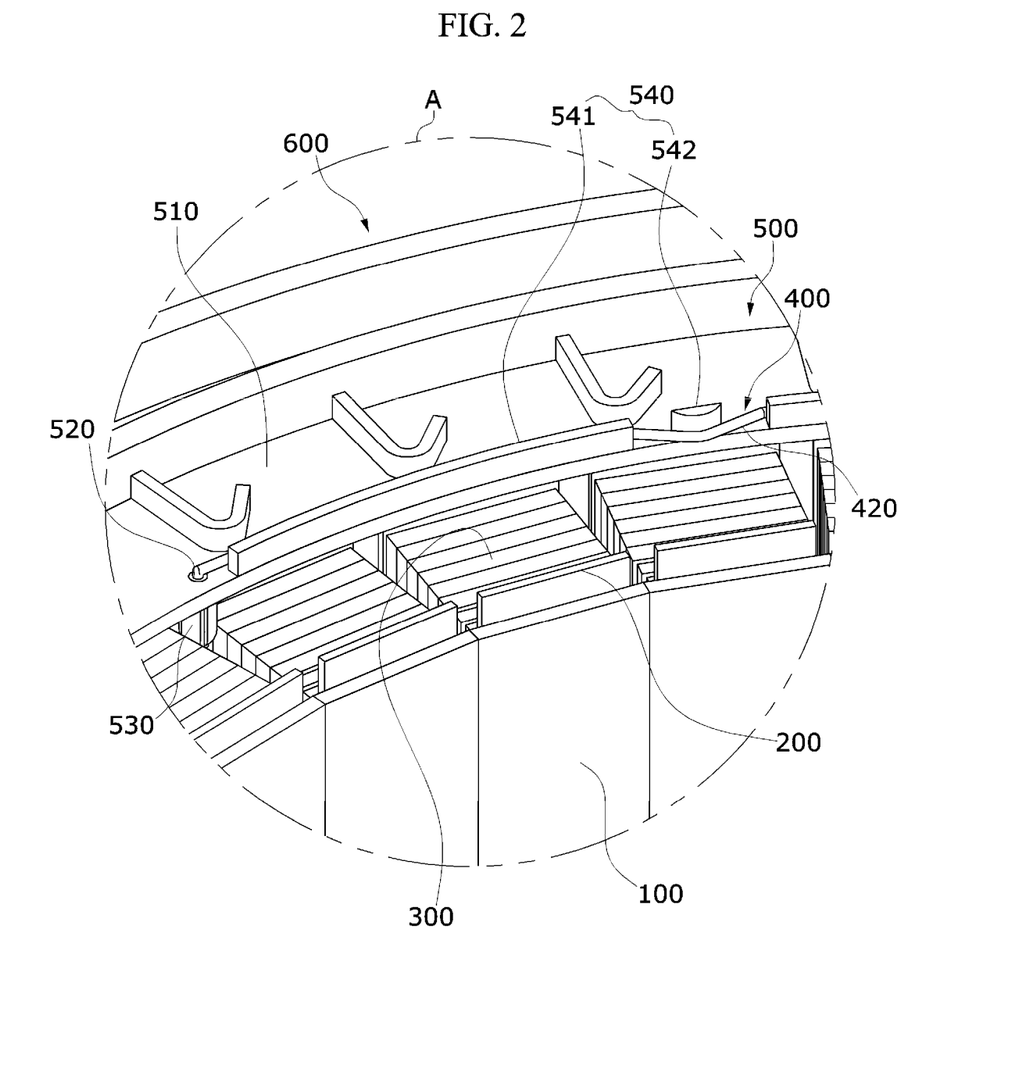
FIG. 2 is an enlarged view of a region "A" illustrated in FIG. 1.
Figure 3:
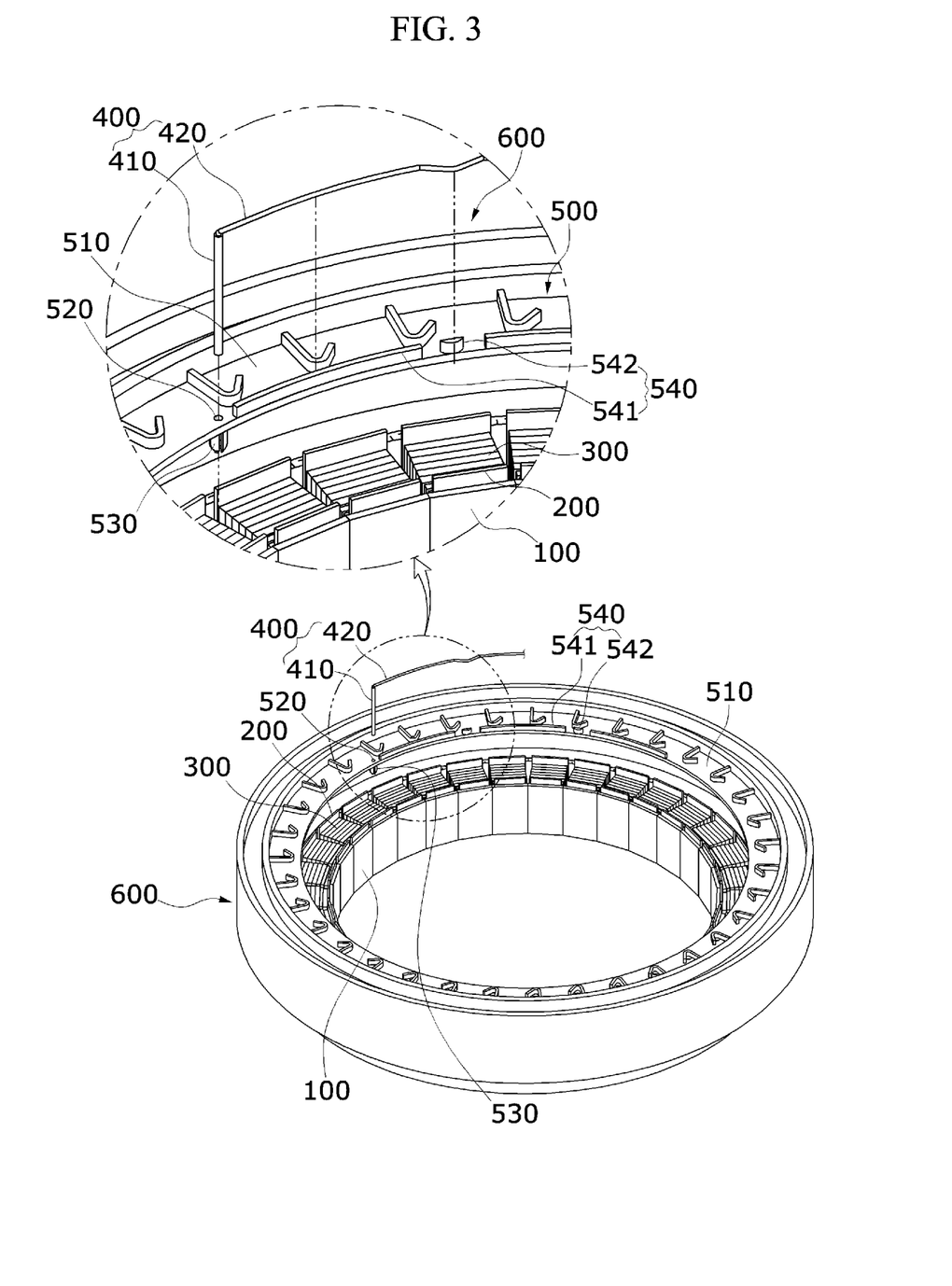
FIG. 3 is an exploded perspective view of a temperature sensor of an annular terminal unit for a drive motor according to an exemplary embodiment of the present invention.
Figure 4:
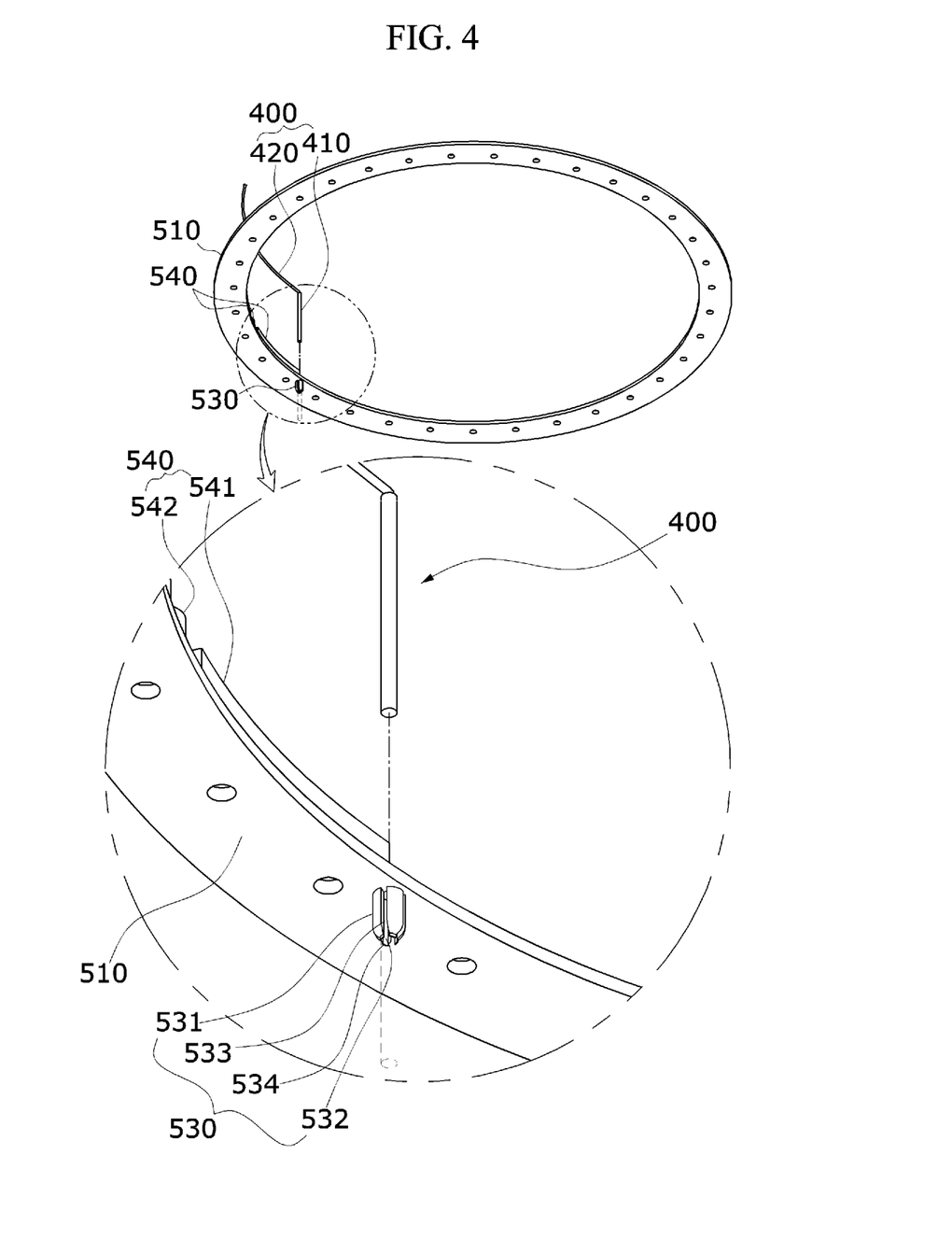
FIG. 4 is a bottom perspective view illustrating a temperature sensor and a fixing part according to an exemplary embodiment of the present invention.
Figure 5:
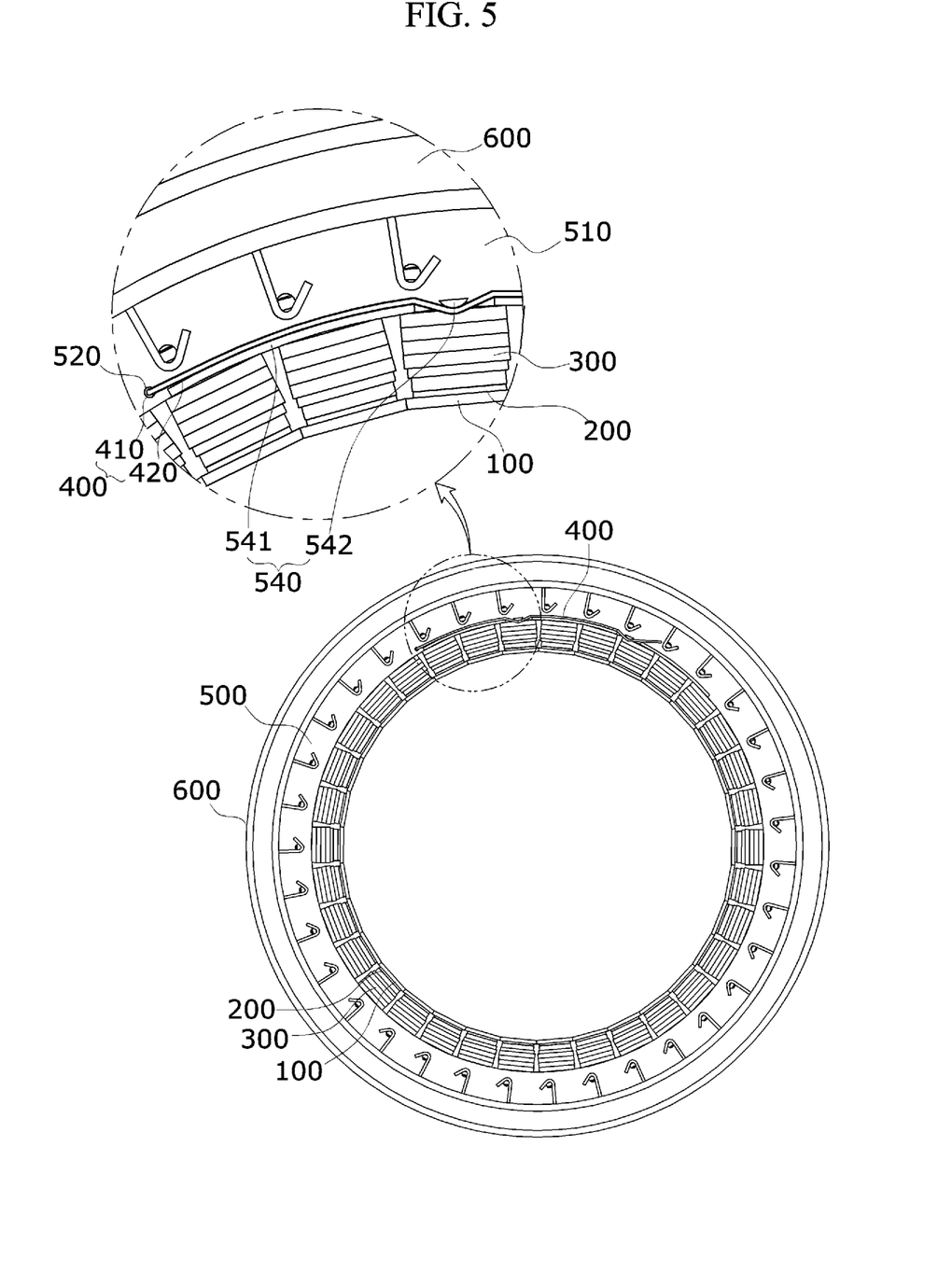
FIG. 5 is a plan view illustrating a structure for assembling a temperature sensor of an annular terminal unit for a drive motor according to an exemplary embodiment of the present invention.

FIG. 1 is a perspective view illustrating an annular terminal unit for a drive motor according to an exemplary embodiment of the present invention. FIG. 2 is an enlarged view of a region A illustrated in FIG. 1. FIG. 3 is an exploded perspective view of the temperature sensor of the annular terminal unit for a drive motor according to the exemplary embodiment of the present invention. FIG. 4 is a bottom perspective view illustrating a temperature sensor and a fixing part according to the exemplary embodiment of the present invention. FIG. 5 is a plan view illustrating a structure for assembling the temperature sensor of the annular terminal unit for a drive motor according to the exemplary embodiment of the present invention.

Referring to FIGS. 1 to 5, the structure for assembling the temperature sensor of the annular terminal unit for a drive motor according to the present exemplary embodiment includes cores 100, bobbins 200, stator coils 300, a temperature sensor 400, and a terminal holder 500.

The cores 100, which are radially arranged, face toward a center of the terminal holder 500.

Each bobbin 200 has a width less than a width of each core 100.

Each of the bobbins 200 is inserted into each of the plurality of cores 100.

Each core 100, into which each bobbin 200 is inserted, is fixed by a surrounding support ring 600.

Each of the stator coils 300 is wound around each of the bobbins 200, which is inserted into each of the plurality of cores 100 so that current is supplied, and the stator coils 300 are preferably wound in a concentrated winding type with a large coil tension.

The temperature sensor 400 is provided to measure a temperature of a drive motor and is fixed to the terminal holder 500.

Specifically, the temperature sensor 400 passes through the terminal holder 500 in a vertical direction of the terminal holder 500 and is inserted between the plurality of bobbins 200 around which the stator coils 300 are wound.

That is, in the structure in which the temperature sensor 400 is inserted and coupled to the terminal holder 500 in the vertical direction, the temperature sensor 400 passes through the terminal holder 500 in the vertical direction and is inserted between the plurality of bobbins 200, and thus, a temperature of the stator coil 300, which is a main heating element of the drive motor, may be accurately measured so that the sensing performance of the temperature sensor 400 may be improved.

In addition, in the structure in which the temperature sensor 400 is inserted and coupled to the terminal holder 500 in the vertical direction, a plurality of temperature sensors 400 are inserted into the terminal holder 500, and thus, the temperature sensors 400 may be blocked from being brought into direct contact with the terminal holder 500 due to external factors. Accordingly, a risk of damage to the temperature sensors 400 may be reduced so that the durability of the temperature sensors 400 may be improved.

The temperature sensor 400 includes a thermistor (not illustrated), an insulator 410, and a lead wire 420.

The thermistor is fixed to a fixing part 530 of the terminal holder 500 to sense a temperature of the drive motor.

The thermistor measures the temperature of the drive motor by being fixed to the terminal holder 500 and then sends a signal for the measured temperature to an electronic control device disposed outside the drive motor.

The electronic control device senses the temperature of the drive motor in real time using the temperature signal supplied by the thermistor.

The insulator 410 surrounds the thermistor, and an outer circumferential surface thereof is in direct contact with an inner circumferential surface of the fixing part 530 of the terminal holder 500 which will be described below.

The thermistor is accommodated inside the insulator 410, and a separate reference numeral thereof will be omitted in the drawings.

Further, the lead wire 420 electrically connects the thermistor to a terminal of the terminal holder 500, and one end thereof is connected to the thermistor and the other end is connected to the terminal of the terminal holder 500.

Specifically, one end of the lead wire 420 is connected to the thermistor fixed to the fixing part 530 of the terminal holder 500 and is fixed to the terminal holder 500, and then the other end of the lead wire 420 is connected to the terminal of the terminal holder 500.

The terminal holder 500 is formed to have a closed loop having an annular shape and is made of an insulating material, such as a plastic material.

Further, an upper part of the terminal holder 500 is open, and a plurality of annular bus bars and a plurality of spacers are accommodated in an interior, that is, an accommodation space, of the terminal holder 500.

The terminal holder 500 includes a body part 510, an insertion hole 520, the fixing part 530, and a guide part 540.

The body part 510 forms a body of the terminal holder 500 and is formed to have an annular shape.

The insertion hole 520 is a part located at a predetermined position of the body part 510 and through which an upper surface and a lower surface of the body part 510 communicate with each other, and the temperature sensor 400 is inserted into the insertion hole 520.

An inner diameter of the insertion hole 520 is preferably equal to an outer diameter of the temperature sensor 400.

Accordingly, when the temperature sensor 400 is inserted into the insertion hole 520, the temperature sensor 400 may be easily inserted into the body part 510 of the terminal holder 500 and coupled to the terminal holder 500.

The fixing part 530 is formed on a lower surface of the body part 510 in a region corresponding to the insertion hole 520.

Further, the fixing part 530 is a part through which the temperature sensor 400 inserted through the insertion hole 520 passes, and the fixing part 530 elastically fixes the temperature sensor 400 passing through the fixing part 530.

To this end, the fixing part 530 includes a fixing protrusion 531, an elastic groove 533, and a separation-preventing protrusion 534.

The fixing protrusion 531 extends downward from the lower surface of the body part 510 in the region corresponding to the insertion hole 520.

Further, a through-hole 532 is formed in a central part of the fixing protrusion 531 such that the temperature sensor 400 inserted through the insertion hole 520 passes therethrough.

The through-hole 532 of the fixing protrusion 531 is a part which fixes the temperature sensor 400 inserted through the insertion hole 520, and an inner diameter of the through-hole 532 is preferably less than the outer diameter of the temperature sensor 400.

The elastic groove 533 is a part which is formed in the fixing protrusion 531 in an incised shape, and the elastic groove 533 elastically fixes the temperature sensor 400.

The elastic groove 533 is preferably formed in the fixing protrusion 531 to have a cross (+) shape in a plan view.

That is, the elastic groove 533 is formed to have a cross (+) shape with the through-hole 532 of the fixing protrusion 531 as a center thereof.

Therefore, when the temperature sensor 400 formed to have an outer diameter greater than the inner diameter of the through-hole 532 passes through the fixing protrusion 531, the temperature sensor 400 may be elastically and firmly fixed to the fixing protrusion 531 due to the elastic groove 533.

The separation-preventing protrusion 534 is a part which extends from a lower end part of the fixing protrusion 531, and the separation-preventing protrusion 534 preferably extends downward from a periphery of the through-hole 532 of the fixing protrusion 531.

When the temperature sensor 400 passing through the through-hole 532 is inserted into the separation-preventing protrusion 534, an inner circumferential surface of the separation-preventing protrusion 534 is brought into contact with an outer circumferential surface of the temperature sensor 400.

The separation-preventing protrusion 534 is preferably formed to have an inclined shape in which an inner circumferential surface thereof is inclined downward in an inward direction.

Therefore, the separation-preventing protrusion 534 may effectively prevent the temperature sensor 400 passing through the fixing protrusion 531 from being separated therefrom again in a reverse direction.

That is, the separation-preventing protrusion 534 may firmly prevent the temperature sensor 400 from being separated from the fixing protrusion 531 in the reverse direction.

The guide part 540 is a part which is formed along an inner upper surface of the body part 510 having an annular shape, and the guide part 540 fixes one end and the other end of the lead wire 420 of the temperature sensor 400.

The guide part 540 includes circumferential protrusions 541 and a semicircular protrusion 542.

The circumferential protrusions 541 are parts which are formed to be spaced apart from each other along the inner upper surface of the body part 510, and the circumferential protrusions 541 are formed to have a band shape.

The semicircular protrusion 542 is a part which is formed between the circumferential protrusions 541 spaced apart from each other, and one surface of the body part 510 located in a central direction of the body part 510 is formed to have a curved surface with a protruding shape in the central direction of the body part 510 on the inner side surface of the body part 510.

In this case, the circumferential protrusion 541 and the semicircular protrusion 542 are also formed to be spaced apart from each other.

The lead wire 420 is fixed to the circumferential protrusion 541 and the semicircular protrusion 542.

Specifically, one end of the lead wire 420 is drawn out from the thermistor and the insulator 410 and is brought into contact with an outer circumferential surface of the circumferential protrusion 541, protrudes between the circumferential protrusion 541 and the semicircular protrusion 542, and then is pressed against one surface of the semicircular protrusion 542, which is formed to have a curved surface shape.

Therefore, the lead wire 420, which is fixed to the semicircular protrusion 542 and the circumferential protrusion 541, is pressed against the curved surface of the semicircular protrusion 542, and thus, the tension of the lead wire 420 may be increased so that the temperature sensor 400 may be firmly fixed to the terminal holder 500.

Accordingly, in the structure for assembling the temperature sensor 400 coupled to the guide part 540, the lead wire 420 of the temperature sensor 400 may be firmly fixed to the terminal holder 500 without an additional part, and thus, costs incurred due to materials and assembly facilities for assembling the lead wire 420 may be reduced and costs of the drive motor may be lowered.

A length of the circumferential protrusion 541 may be greater than a length of the semicircular protrusion 542.

Accordingly, the length of the lead wire 420 that comes into contact with the outer circumferential surface of the circumferential protrusion 541 increases, and thus the lead wire 420 may be stably and firmly fixed to the guide part 540.

Hereinafter, a method of assembling a temperature sensor 400 for a drive motor according to an exemplary embodiment of the present invention will be described in detail with reference to the accompanying drawings.

Figure 6:
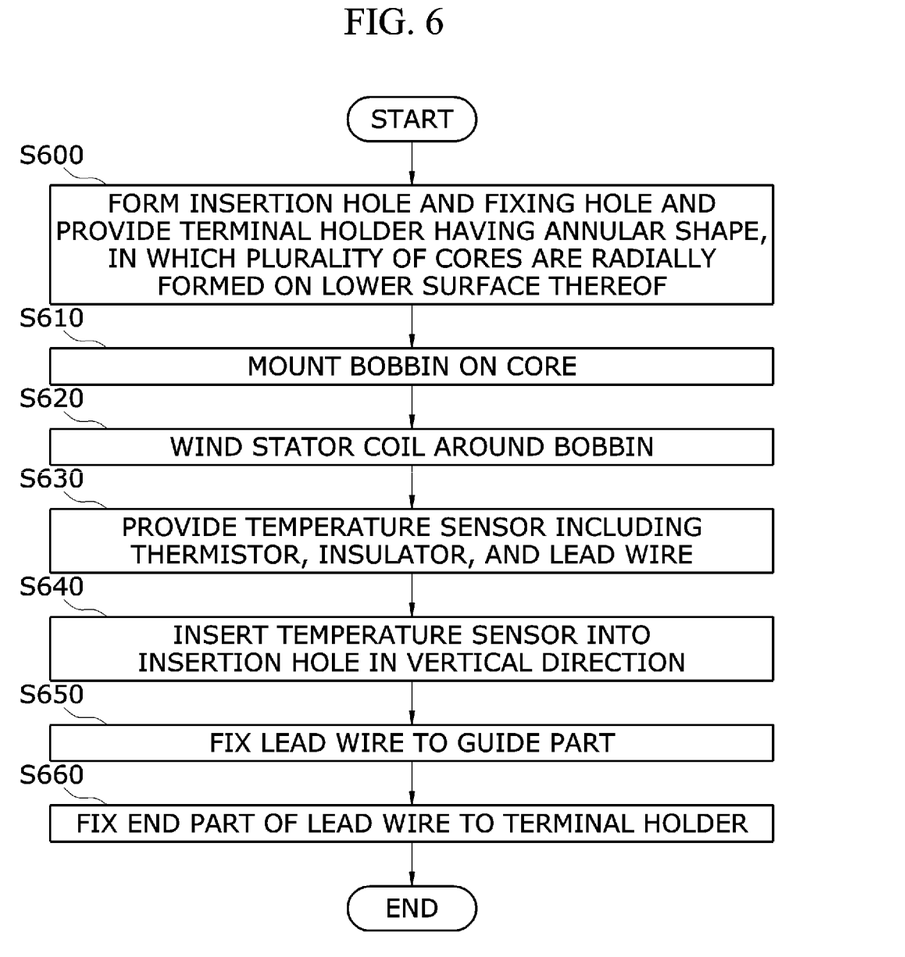
FIG. 6 is a flowchart illustrating a method of assembling a temperature sensor of an annular terminal unit for a drive motor according to an exemplary embodiment of the present invention.

FIG. 6 is a flowchart illustrating a method of assembling a temperature sensor of an annular terminal unit for a drive motor according to an exemplary embodiment of the present invention.

Referring to FIG. 6, in the method of assembling the temperature sensor 400 for a drive motor according to the exemplary embodiment of the present invention, first, an insertion hole 520 and a fixing hole are formed, and a terminal holder 500 having an annular shape is provided in which a core 100 is disposed on a lower surface thereof (S600).

The cores 100, which are radially arranged, face toward a center of the terminal holder 500.

Each bobbin 200 has a width less than a width of each core 100.

Then, a bobbin 200 is mounted on each of the cores 100 (S610).

Next, a stator coil 300 is wound around each of the bobbins 200, which is mounted on each of the cores 100 (S620).

Here, each of the stator coils 300 is wound around each of the bobbins 200 inserted into each of the plurality of cores 100 so that current is supplied, and the stator coils 300 are wound in a concentrated winding type with a large coil tension.

A temperature sensor 400 including a thermistor, an insulator 410, and a lead wire 420 is provided (S630).

Next, the provided temperature sensor 400 is inserted into the insertion hole 520 formed in the terminal holder 500 in a vertical direction of the insertion hole 520 (S640).

Here, a fixing part 530 is formed on the lower surface of the terminal holder 500 in a region corresponding to the insertion hole 520.

The fixing part 530 includes a fixing protrusion 531, an elastic groove 533, and a separation-preventing protrusion 534. When the temperature sensor 400 passes through the fixing protrusion 531 in which the elastic groove 533 is formed, the elastic groove 533 elastically fixes the temperature sensor 400 while being elastically closed.

Accordingly, the temperature sensor 400, which is inserted into the terminal holder 500 in the vertical direction and passes through the fixing part 530, may be elastically and firmly fixed to the terminal holder 500.

Next, the lead wire 420 of the temperature sensor 400 is fixed to a guide part 540 (S650).

The guide part 540 includes circumferential protrusions 541 spaced apart from each other along an inner upper surface of the body part 510, and a semicircular protrusion 542 of which one surface located in a central direction of the body part 510 is formed to have a curved surface with a protruding shape in the central direction of the body part 510 on the inner side surface of the body part 510. One end of the lead wire 420 of the temperature sensor 400 is drawn out from the thermistor and the insulator 410 and is brought into contact with an outer circumferential surface of the circumferential protrusion 541, protrudes between the circumferential protrusion 541 and the semicircular protrusion 542, and then is pressed against one surface of the semicircular protrusion 542, which is formed to have a curved surface.

Therefore, the lead wire 420, which is fixed to the semicircular protrusion 542 and the circumferential protrusion 541, is pressed against the curved surface of the semicircular protrusion 542 and thus the tension of the lead wire 420 may be increased so that the temperature sensor 400 may be firmly fixed to the terminal holder 500.

Finally, an end part of the lead wire 420, which is formed in a direction opposite to the direction in which the thermistor and the insulator 410 are formed, is fixed to the terminal holder 500 (S660). Therefore, the assembly sequence of the temperature sensor 400 for a drive motor according to the inventive concepts is completed and ends.

As described above, in the structure for assembling the temperature sensor of the annular terminal unit for a drive motor and the method of assembling the temperature sensor according to the present invention, the temperature sensor 400 passes through the terminal holder 500 in the vertical direction of the terminal holder 500 and is inserted between the plurality of bobbins 200 around which the stator coils 300 are wound, and thus a temperature of the stator coil 300, which is a main heating element of the drive motor, may be accurately measured so that the sensing performance of the temperature sensor 400 may be improved. The temperature sensor 400 may be blocked from being brought into direct contact with the terminal holder 500 due to external factors. Accordingly, a risk of damage to the temperature sensors 400 may be reduced so that the durability of the temperature sensors 400 may be improved.

When the temperature sensor 400 formed to have an outer diameter greater than the inner diameter of the through-hole 532 passes through the fixing protrusion 531, the temperature sensor 400 may be elastically and firmly fixed to the fixing protrusion 531 due to the elastic groove 533.

Further, when the temperature sensor 400 passing through the through-hole 532 is inserted into the separation-preventing protrusion 534, which is formed to have an inclined shape in which an inner circumferential surface of the separation-preventing protrusion 534 is inclined downward in an inward direction, the inner circumferential surface of the separation-preventing protrusion 534 is brought into contact with an outer circumferential surface of the temperature sensor 400, and thus the separation-preventing protrusion 534 may effectively prevent the temperature sensor 400 passing through the fixing protrusion 531 from being separated therefrom again in a reverse direction.

In addition, the lead wire 420 is pressed against the curved surface of the semicircular protrusion 542, and thus the tension of the lead wire 420 may be increased so that the temperature sensor 400 may be firmly fixed to the terminal holder 500. Therefore, the lead wire 420 of the temperature sensor 400 may be firmly fixed to the terminal holder 500 without an additional part, and thus costs incurred due to materials and assembly facilities for assembling the lead wire 420 may be reduced and costs of the drive motor may be lowered.

In the structure for assembling the temperature sensor of the annular terminal unit for a drive motor and the method of assembling the temperature sensor according to the present invention, a temperature sensor can pass through a terminal holder in a vertical direction of the terminal holder and be inserted between a plurality of bobbins around which stator coils are wound, and thus a temperature of the stator coil, which is a main heating element of the drive motor, can be accurately measured so that the sensing performance of the temperature sensor can be improved. The temperature sensor can be blocked from being brought into direct contact with the terminal holder due to external factors. Accordingly, a risk of damage to the temperature sensor can be reduced so that the durability of the temperature sensor can be improved.

In addition, when the temperature sensor formed to have an outer diameter greater than an inner diameter of a through-hole passes through a fixing protrusion, the temperature sensor can be elastically and firmly fixed to the fixing protrusion due to an elastic groove.

Further, when the temperature sensor passing through the through-hole is inserted into a separation-preventing protrusion, which is formed to have an inclined shape in which an inner circumferential surface of the separation-preventing protrusion is inclined downward in an inward direction, the inner circumferential surface of the separation-preventing protrusion can be brought into contact with the outer circumferential surface of the temperature sensor, and thus the separation-preventing protrusion can effectively prevent the temperature sensor passing through the fixing protrusion from being separated therefrom again in a reverse direction.

In addition, a lead wire can be pressed against a curved surface of the semicircular protrusion, and thus the tension of the lead wire can be increased so that the temperature sensor can be firmly fixed to the terminal holder. Therefore, lead wire of the temperature sensor can be firmly fixed to the terminal holder without an additional part, and thus costs incurred due to materials and assembly facilities for assembling the lead wire can be reduced and costs of the drive motor can be lowered.

The present invention is not limited to the above-described embodiments and may be variously modified and embodied within a range in which the technical spirit of the present invention is permitted.

What is claimed is:

1. A structure for assembling a temperature sensor of an annular terminal unit for a drive motor, the structure comprising:
    a terminal holder having an annular shape;
    a temperature sensor fixed to the terminal holder;
    a plurality of cores radially arranged on a lower surface of the terminal holder;
    a bobbin inserted into each of the plurality of cores; and
    a stator coil wound around each of the bobbins,
    wherein:
    the temperature sensor passes through the terminal holder in a vertical direction of the terminal holder and is inserted between the bobbins around which the stator coils are wound;
    the terminal holder includes:
        a body part configured to form a body of the terminal holder;
        an insertion hole through which an upper surface and a lower surface of the body part communicate with each other;
        a fixing part extending from the lower surface of the body part in a region corresponding to the insertion hole and through which the temperature sensor passes; and
        a guide part formed along an inner upper surface of the body part, the guide part having an annular shape and configured to fix a lead wire of the temperature sensor.

2. The structure of claim 1, wherein the fixing part includes:
    a fixing protrusion extending downward from the lower surface of the body part in the region corresponding to the insertion hole;
    an elastic groove formed in the fixing protrusion to have an incised shape and configured to elastically fix the temperature sensor; and
    a separation-preventing protrusion extending from a lower end part of the fixing protrusion.

3. The structure of claim 1, wherein the guide part includes:
    circumferential protrusions spaced apart from each other along the inner upper surface of the body part; and
    a semicircular protrusion having one curved surface located in an inner side direction of the body part.

4. The structure of claim 3, wherein a length of the circumferential protrusion is greater than a length of the semicircular protrusion.

5. The structure of claim 4, wherein the temperature sensor includes:
    a thermistor fixed to the fixing part;
    an insulator surrounding the thermistor; and
    the lead wire electrically connecting the thermistor to a terminal of the terminal holder.

6. The structure of claim 5, wherein the lead wire is brought into contact with an outer circumferential surface of the circumferential protrusion, protrudes between the circumferential protrusion and the semicircular protrusion, and is pressed against the curved surface of the semicircular protrusion.

7. A method of assembling a temperature sensor of an annular terminal unit for a drive motor, the method comprising:
    forming an insertion hole and a fixing hole and providing a terminal holder having an annular shape, in which a plurality of cores are radially arranged on a lower surface thereof;
    mounting a bobbin on each of the cores;

winding a stator coil around each of the bobbins;
providing a temperature sensor including a thermistor, an insulator, and a lead wire;
inserting the temperature sensor into the insertion hole in a vertical direction of the insertion hole;
fixing the lead wire to a guide part; and
fixing an end part of the lead wire to the terminal holder, wherein:
the terminal holder includes:
- a body part forming a body of the terminal holder;
- the insertion hole through which an upper surface and a lower surface of the body part communicate with each other;
- a fixing part extending from the lower surface of the body part in a region corresponding to the insertion hole and through which the temperature sensor passes; and
- a guide part formed along an inner upper surface of the body part, the guide part having an annular shape and configured to fix a lead wire of the temperature sensor;
- the guide part includes circumferential protrusions spaced apart from each other along the inner upper surface of the body part; and
- a semicircular protrusion of which one surface, which is located in an inner side direction of the body part, is formed to have a curved surface.

8. The method of claim 7, wherein the guide part includes:

circumferential protrusions spaced apart from each other along the inner upper surface of the body part; and a semicircular protrusion of which one surface, which is located in an inner side direction of the body part, has a curved surface, wherein the lead wire is brought into contact with an outer circumferential surface of the circumferential protrusion; protrudes between the circumferential protrusion and the semicircular protrusion; and is pressed against the curved surface of the semicircular protrusion.

* * * * *